(12) United States Patent
Archer et al.

(10) Patent No.: US 7,035,767 B2
(45) Date of Patent: Apr. 25, 2006

(54) METHOD AND SYSTEM FOR REPORTING AND DIAGNOSING COMPONENTS OF A BULK FUEL DISTRIBUTION FACILITY

(75) Inventors: Tim Archer, Suwanee, GA (US); Warren Gray, Sugar Hill, GA (US); Warren Sutcliffe, Duluth, GA (US); Xiaojing (Amanda) Sang, Roswell, GA (US); Steven Jackson, Norcross, GA (US)

(73) Assignee: Varec, Inc., Norcross, GA (US)

( * ) Notice: Subject to any disclaimer, the term of this patent is extended or adjusted under 35 U.S.C. 154(b) by 18 days.

(21) Appl. No.: 10/867,287

(22) Filed: Jun. 14, 2004

(65) Prior Publication Data

US 2005/0288897 A1    Dec. 29, 2005

(51) Int. Cl.
*G06F 11/30*    (2006.01)
*G21C 17/00*    (2006.01)

(52) U.S. Cl. .................................................... 702/183
(58) Field of Classification Search ................. 702/183
See application file for complete search history.

(56) References Cited

U.S. PATENT DOCUMENTS

| | | | |
|---|---|---|---|
| 6,370,515 B1 | 4/2002 | Diamond et al. | 705/28 |
| 2001/0034567 A1 * | 10/2001 | Allen et al. | 700/283 |
| 2002/0116299 A1 | 8/2002 | Diamond et al. | 705/28 |

OTHER PUBLICATIONS

Varec, Inc., "FuelsManager® Oil & Gas User Manual", 161 pgs., Apr. 2004, www.varec.com.
Varec, Inc., "FuelsManager® Oil & Gas Automation Solutions for oil & gas, defense and aviation applications", 1-16 pgs., Apr. 2004.

* cited by examiner

*Primary Examiner*—Michael Nghiem
(74) *Attorney, Agent, or Firm*—King & Spalding LLP

(57) ABSTRACT

A method and system integrates the monitoring of system components and detecting errors or potential problems (or both) in components of bulk fuel distribution facilities. Generally, the method and system includes a diagnostic support module for identifying what stand alone software modules, what fuel hardware, and what software interfaces/drivers associated with the fuel hardware are present in a bulk fuel distribution facility. After the diagnostic support module identifies the unique system components of a particular bulk fuel facility that can include software and fuel hardware, the diagnostic support module can perform system checks of the system components to determine if any system components are missing or if errors or potential problems (or any combination thereof) may exist in a particular bulk fuel distribution facility. The system checks performed by the diagnostic support module can include comparing information collected from the system components against a predetermined set of validation rules.

17 Claims, 6 Drawing Sheets

METHOD AND SYSTEM FOR REPORTING AND DIAGNOSING COMPONENTS OF A BULK FUEL DISTRIBUTION FACILITY

TECHNICAL FIELD

The invention relates generally to bulk fuel distribution facilities, and more specifically, to collecting information on various software and hardware components of a bulk fuel distribution facility and performing diagnostic checks on the components thereof.

BACKGROUND OF THE INVENTION

Many conventional bulk fuel distribution facilities include system components that are unique because of the application or end-use of the fuel distribution facility. For example a fuel distribution facility for supplying fuel to aircrafts may have fuel blending operations that are quite different, and hence unique, relative to another fuel distribution facility that may be designed for supporting automobile fuels. The different end use operations or applications for each fuel distribution facility may require unique hardware and software that can only be used for the end-use or application of the fuel distribution facility.

The unique hardware and software that may be needed to support fuel operations of a fuel distribution facility may be manufactured by different vendors relative to the owner of the fuel distribution facility. For example, tank level instruments for monitoring fuel inventory may be manufactured by a first party while carrier stations for receiving fuel distribution orders or requests may be made by a second party that is different from the first party and that is different from the fuel distribution facility operator. These different hardware vendors may provide only direct communication links or instrumentation to their software or hardware for monitoring by the owner/operators of the fuel distribution facility. In some rare cases, the hardware vendors may permit their software or hardware (or both) to connect with a common interface or bus that may be accessed by software and hardware manufactured by other vendors.

This segmentation of fuel system components made by various vendors can lead to inefficient operation of a bulk fuel distribution facility. The operator of the bulk fuel distribution facility may only be provided with separate instruments or separate control lines or buses that are coupled to each respective different vendor hardware. It may be difficult for the operator of the fuel distribution facility to collect data as well as monitor all operations of the various vendor components of the bulk fuel distribution facility.

In those cases in which vendors permit their specific hardware or software to link up with a common interface or bus, it may also prove difficult for the operator of the fuel distribution to identify malfunctioning system components that may be coupled to the common interface or bus. For example, a malfunctioning tank level instrument coupled to a common bus may cause a pump valve also coupled to the common bus to operate at an unscheduled time. In such a scenario, the operator of the bulk fuel distribution facility may be need to check both the tank level instrument and the pump valve for errors if it appears that both hardware items are not operating correctly. This leads to an inefficiency because only one system component, such as the tank level instrument, may have an error or problem while the other system component coupled to the tank level instrument, such as a pump valve, may be operating without any flaws.

Another problem associated with the operation of bulk fuel distribution facilities is when a multi-site operator desires to collect operational or routine data from various different bulk fuel distribution facilities. A multi-site operator usually needs to make a physical visit to a fuel distribution facility in order to gather data from various system components that make up a particular bulk fuel distribution facility. Alternatively, a multi-site operator may request a local site operator to track down and transmit system component performance or error data to the multi-site operator. This tracking and transmission of performance or error data by local sites operators can often be time consuming and can include inaccuracies due to human error.

While some efforts have been made in the prior art to eliminate human errors by automating some aspects of bulk fuel distribution facilities, the prior art does not provide any method or system for diagnosing or checking performance or operations of a bulk fuel distribution facility. For example, U.S. Pat. No. 6,370,515 issued in the name of Diamond et al. on Apr. 9, 2002 provides a bulk terminal automation system for automating and coordinating delivery operations of bulk shipping terminals located at a bulk fuel distribution facility. This patent is mainly concerned with monitoring bulk shipping terminals, transferring loading and inventory data to a central server, and formatting the data at the central server in response to a user requests or according to user selected data formats.

Accordingly, there is need in the art for centralized management, monitoring, and troubleshooting of system components of a bulk fuel distribution facility. There is a need in the art for a method or system for integrating the monitoring of system components made by different hardware vendors and detecting errors or potential problems (or both) in the system components of bulk fuel distribution facilities. There is also a need in the art for centralized management of multiple bulk fuel distribution facilities in which data for multiple bulk fuel distribution facilities can be stored in a single location such as a central database.

SUMMARY OF THE INVENTION

The invention can include a method or system for integrating the monitoring of system components and detecting errors or potential problems (or both) in the system components of bulk fuel distribution facilities. Generally, the method and system can include a diagnostic support module for identifying what stand alone software modules, what fuel hardware, and what software interfaces and/or drivers associated with the fuel hardware are present in a bulk fuel distribution facility. Because a particular bulk fuel distribution facility may have different and unique fuel hardware relative to another bulk fuel distribution facility, each diagnostic support module can also be unique or customized for a particular bulk fuel distribution facility.

In other words, each fuel distribution facility may have a specific end-use or application, such as for refueling aircraft or for filling carrier tanks destined for gasoline service stations. These specific end-uses or applications can require different and sometimes unique fuel hardware, such as instruments like tank gauges, or other fuel hardware such as pre-sets for distributing the bulk fuel products. Tank gauges and pre-sets can use unique and sometimes proprietary drivers, software interfaces, or buses, or any combination thereof. Each diagnostic support module can be tailored or customized for these underlying system components, such as the fuel hardware that may be unique to the end use or application of the fuel product. This means that one bulk fuel distribution facility may have different system components compared to another bulk fuel distribution facility.

The diagnostic support module can gather or integrate data from various software components and fuel hardware of a bulk fuel distribution facility. The software components can include stand alone software modules and software modules associated with specific fuel hardware. The stand alone software modules are modules that are not associated with any particular fuel hardware of a fuel distribution facility. For example, the stand alone software modules can include modules that form or are part of a supervisory control and data acquisition (SCADA) system. The SCADA system can comprise a computer system for gathering and analyzing real time data generated by other hardware and software of a bulk fuel distribution facility.

Meanwhile, software modules associated with fuel hardware can include interfaces or drivers (or both) that can be unique to a specific fuel hardware component such as an instrument. For example, a fluid level instrument like a proprietary tank gauge or a bus associated with a tank gauge can be unique or customized for an application. Other fuel hardware with unique interfaces or drivers (or both) can include, but are not limited to, pre-sets that may control distribution of fuel product, driver or carrier terminals/stations that may be used to initiate fuel product distribution, valves, meters, entry gates, programmable logic controllers (PLCs), and instrumentation, and other like fuel hardware components.

After a diagnostic support module identifies the unique system components of a particular bulk fuel facility that can comprise software and fuel hardware, the diagnostic support module can perform system checks of the system components to determine if any system components are missing or if errors or potential problems (or any combination thereof) may exist in a particular bulk fuel distribution facility. The system checks performed by the diagnostic support module can include comparing information collected from the system components against a predetermined set of validation rules.

For example, a validation rule can include a table comprising a mapping of file versions to different software modules. This file version mapping can help identify compatibility between different software modules. Another exemplary rule can use the version of SCADA present in a system to identify files that should likely be present for the SCADA version existing in the system to operate properly. Another exemplary rule can compare previously stored diagnostics results with the current system or diagnostic check being performed by the diagnostic support module. The aforementioned rules are just a few examples. Other rules of increasing or decreasing complexity are not beyond the scope of the invention.

According to one exemplary aspect, the diagnostic support module can support interactive access in which the diagnostic support module can be accessed by a web browser. Accessing a web page or universal resource locater (URL) supported by the diagnostic support module can be an event that triggers the diagnostic support module to perform its checks of system components of a particular bulk fuel distribution facility. According to this exemplary aspect, diagnostic information concerning several different bulk fuel distribution facilities can be collected and maintained at a central location accessible by the web browser.

According to another exemplary aspect, the diagnostic support module can support batch access in which the diagnostic support module receives a set (a "batch") of commands or jobs, executes them, and returns the results without human intervention. This contrasts with the aforementioned interactive web browser-accessed diagnostic support module in which a user's commands and the computer's responses can be interleaved during a single run. A batch accessed diagnostic support module can take its commands from a disk file and return the results to a file (or prints them). There could be queue of jobs which the diagnostic support module processes as resources become available. According to this exemplary aspect, diagnostic information concerning several different bulk fuel distribution facilities can be collected maintained at a central location by the batch file facility/module.

According to a further exemplary aspect, the diagnostic support module can comprise a sentry-like module that can reside in the system software of a particular bulk fuel distribution facility. This sentry diagnostic support module can automatically perform its checks of system components according to a predetermined schedule or in response to specific events. After performing its checks and analysis, the sentry diagnostic support module could transmit the results of its checks and analysis over a distributed computer network to a central office for storage. Alternatively, or in addition to sending the results to the central office for storage, the sentry diagnostic support module could transmit its results over a distributed computer network via e-mail to a predetermined electronic address.

DETAILED DESCRIPTION OF EXEMPLARY EMBODIMENTS

A method and system can integrate the monitoring of system components and detecting errors or potential problems (or both) in components of bulk fuel distribution facilities. Generally, the method and system includes a diagnostic support module for identifying what stand alone software modules, what fuel hardware, and what software interfaces/drivers associated with the fuel hardware are present in a bulk fuel distribution facility. After the diagnostic support module identifies the unique system components of a particular bulk fuel facility that can comprise software and fuel hardware, the diagnostic support module can perform system checks of the system components to determine if any system components are missing or if errors or potential problems (or any combination thereof) may exist in a particular bulk fuel distribution facility. The system checks performed by the diagnostic support module can include comparing information collected from the system components against a predetermined set of validation rules.

According to one exemplary embodiment, the diagnostic support module can support interactive access in which the diagnostic support module can be accessed by a web browser. Accessing a web page or universal resource locator (URL) supported by the diagnostic support module can be an event that triggers the diagnostic support module to perform its checks of system components of a particular bulk fuel distribution facility. According to another exemplary embodiment, the diagnostic support module can support batch access in which the diagnostic support module receives a set (a "batch") of commands or jobs, executes them, and returns the results without human intervention. According to a further exemplary embodiment, the diagnostic support module can comprise a sentry-like module that can reside in the system software of a particular bulk fuel distribution facility. This sentry diagnostic support module can automatically perform its checks of system components according to a predetermined schedule or in response to specific events.

Diagnostic Support Tool 138

Figure 1A:
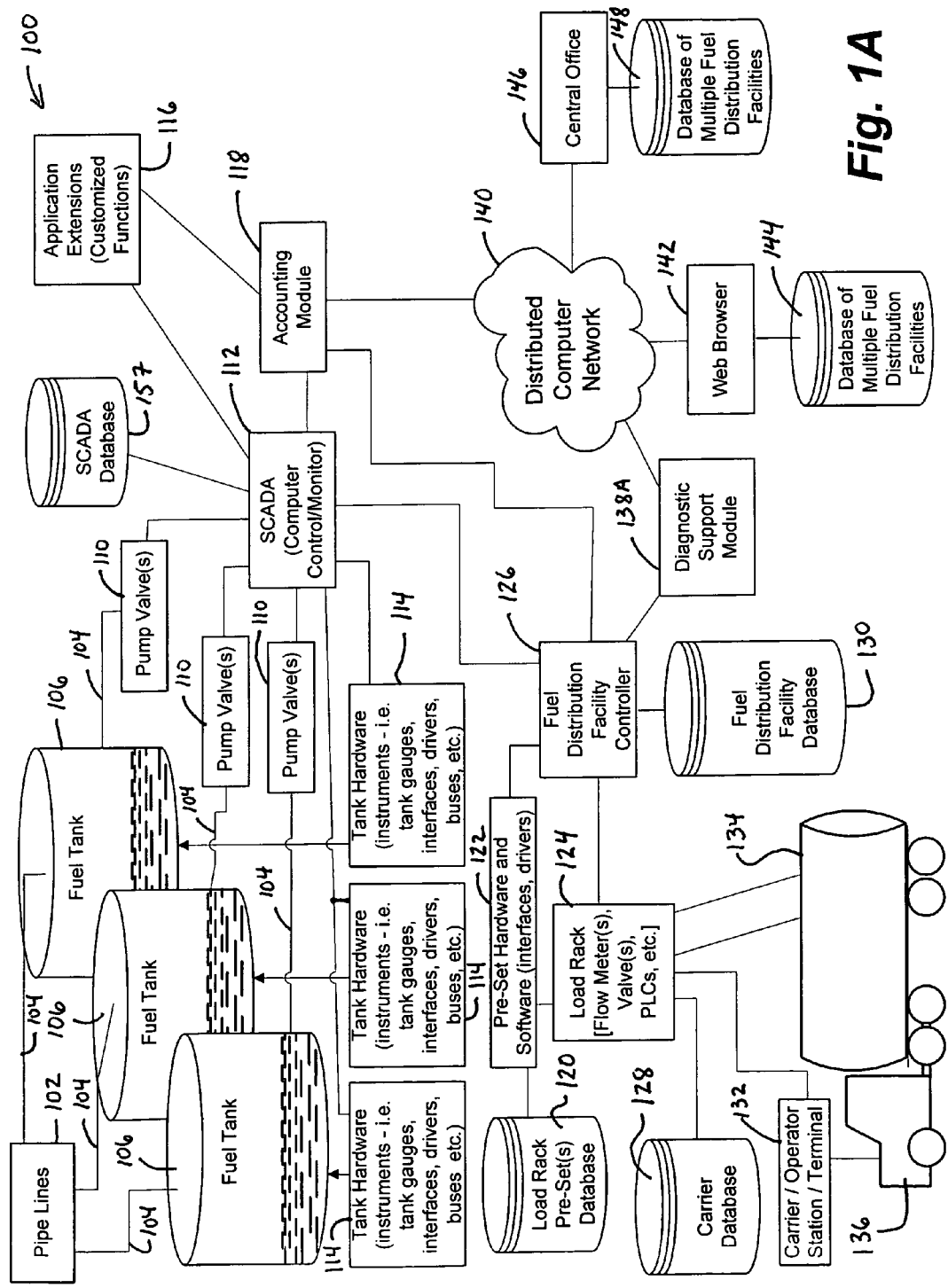
FIG. 1A is a functional block diagram of an interactive diagnostic support module coupled to a bulk fuel distribution facility according to one exemplary embodiment of the present invention.
Figure 1B:
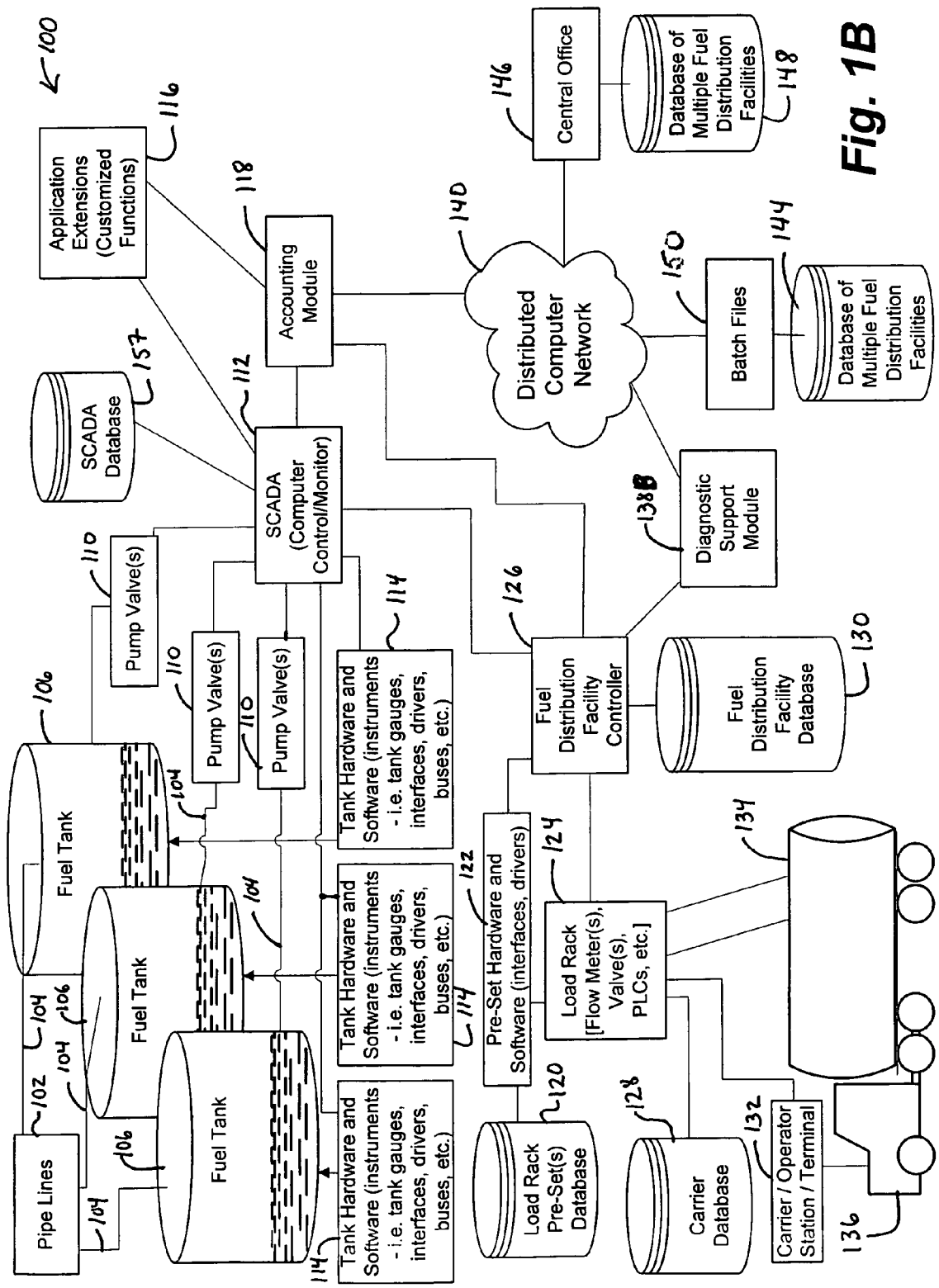
FIG. 1B is a functional block diagram of a diagnostic support module that is batch file accessible and that is coupled to a bulk fuel distribution facility according to an alternative exemplary embodiment of the present invention.
Figure 1C:
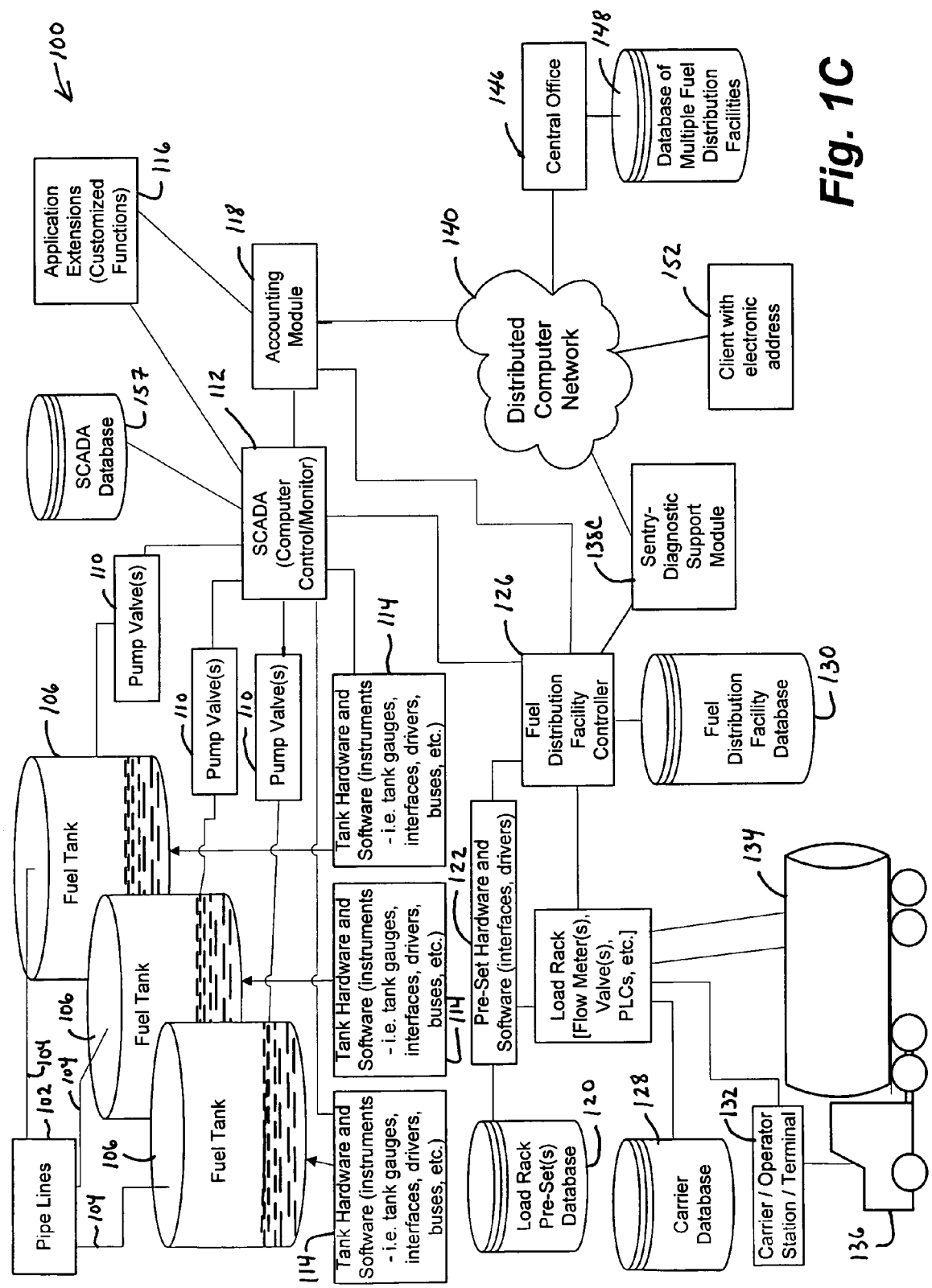
FIG. 1C is a functional block diagram of a diagnostic support module that is configured as a sentry and is coupled to a bulk fuel distribution facility according to yet another alternative exemplary embodiment of the present invention.

FIGS. 1A–1C illustrate exemplary operating environments for an implementation of the invention. Specifically, FIG. 1A is a functional block diagram of an interactive diagnostic support module 138A that is coupled to a bulk fuel distribution facility 100 according to one exemplary embodiment of the present invention. The diagnostic support module 138A can comprise software that integrates the monitoring of system components that make up the bulk fuel distribution facility 100 and detects errors or potential problems in the system components. The diagnostic support module 138A can reside or operate in the background of a fuel distribution facility controller 126. Further details of the diagnostic support module 138A will be described in further detail below with respect to FIGS. 2–4.

Fuel Distribution Facility Controller 126

The fuel distribution facility controller 126 can comprise a computer running software for controlling the operations of various system components that make up the bulk fuel distribution facility 100. The fuel distribution facility controller 126 may comprise a FUELSMANAGER® brand professional oil and gas software toolset that may be used for bulk liquid asset management. The fuel distribution facility controller 126 may monitor the tank hardware and software 114 such as tank level instruments, including tank gauges, inventory management with respect to the fuel tanks 106, alarm management, reporting, and Object Linking and Embedding for Process Control (OPC). The fuel distribution facility controller 126 can provide a fully automated system for providing real time SCADA interaction, a customizable user interface, user friendly information management, and automated data output.

The fuel distribution facility controller 126 coupled to the SCADA system 112 can provide monitoring and control of an entire tank farm that may include fuel tanks 106 by using programmable logic controllers PLC(s) connected to tank hardware and software 114. The tank hardware and software can comprise instrumentation and control devices, such as tank gauges, flow meters, pumps, and valves. Each area of the fuel distribution facility 100 can be shown on a custom graphic display providing an operator with complete control of pipeline receipts, hydrant system control, independent high level alarm systems, emergency fuel shut off (EFSO) and leak detection systems.

The fuel distribution facility controller 126 can display and track all fuel product movements, totals, and discrepancies on a daily basis, including tank to tank transfers, charges, shipments, receipts, yields (rundowns), water drains and blends. With the fuel distribution facility controller 126, fuel product movement data from different days can be compared and archived and printed using standard reports and tickets detailing the actual amounts of fuel product transferred. The fuel distribution facility controller 126 combines inventory management with automation and control of the fuel distribution facility 100. The fuel distribution facility controller 126 can operate on a Microsoft Windows NT 2000, or XP platform. However, other platforms with improved or faster performance are not beyond the invention.

The fuel distribution facility controller 126 receives the data processed by the SCADA system 112 and displays this information on a customizable graphic display (not shown) that can provide the user with complete control of pipeline receipts, hydrant system control, independent high level alarm systems, emergency fuel shut off (EFSO) and leak detection capability. The fuel distribution facility controller 126 can also monitor and control preset hardware and software 122, and it can monitor the load rack 124.

Computer Network Environment

According to another exemplary aspect, instead of the diagnostic support module 138A residing within the fuel distribution facility controller 126, the diagnostic support module 138A can also comprise a general purpose computing device in the form of a conventional personal computer that is coupled to the fuel distribution facility controller 126. The fuel distribution facility controller 126 and the diagnostic support module 138A may operate in a networked environment using logical connections to one or more other remote computers.

The remote computers may be another personal computer, a server, a client such as web browser 142 and central office 146, a router, a network PC, a peer device, a common network node, fuel hardware such as tank hardware and software 114, pre-set hardware 122, the SCADA system 112, a load rack 124, and an accounting module 118. The logical connections depicted in FIG. 1 can include a local area network and a wide area network. Such networking environments are commonplace in offices, large industrial facilities such as a bulk fuel distribution facility 100, enterprise wide computer networks, intranets, and the Internet.

When used in a LAN networking environment, the fuel distribution facility controller 126 and the diagnostic support module 138A (if the diagnostic support module is operating on its own stand-alone computer) may be connected to the LAN through a network interface or adaptor. When used in a WAN network environment, the computers may typically include a modem or other means for establishing communications over the WAN.

In a networked environment, program modules depicted relative to the fuel distribution facility controller 126 may be stored in remote memory storage devices. It will be appreciated that the network connections shown are exemplary and other means of establishing a communications link between computers and fuel hardware other than depicted may be used. Moreover, those skilled in the art will appreciate that the present invention may be implemented in other computer system configurations, including hand held devices, multiprocessor systems, microprocessor based or programmable consumer electronics, networked personal computers, minicomputers, mainframe computers, and the like.

The invention may be practiced in a distributed computing environment as illustrated in FIG. 1A–1C, where tasks may be performed by remote processing devices that are linked through a communications network such as the distributed computer network 140. In a distributed computing environment, program modules may be located in both local and remote storage devices.

Bulk Fuel Distribution Facility 100

The bulk fuel distribution facility 100 may comprise primary pipelines 102, secondary pipelines 104, fuel tanks 106, pump valves 110, a SCADA computer system 112, tank hardware and software 114, application extensions 116, and an accounting module 118. The bulk fuel distribution facility 100 may further comprise a pre-set(s) database 120, pre-set hardware and software 122, a load rack 124, the fuel distribution facility controller 126, a carrier/operator database 128, a fuel distribution facility configuration database 130, a carrier/operator station or terminal 132, and the diagnostic support module 138A discussed above.

The primary pipelines 102 can be coupled to large fuel tanks 106 by secondary pipelines 104. The fuel tanks 106 can maintain the inventory of fuel products for the bulk fuel distribution facility 100. The fuel products can comprise many different types of fuel that may exist in liquid or gaseous forms. The fuel products can comprise oil, natural gas, liquefied natural gas (LNG), gasoline, and other like fuel products. However, the invention is not limited to these type of fuel products. Other types of fuel products include liquefied hydrogen and liquefied oxygen. The present invention may include any type of fuel product available for energy applications.

The fuel tanks 106 may comprise very large structures often used in industrial type applications. However, the present invention is not limited to fuel tanks of this size or magnitude and other types of fuel tanks 106 that may be larger or smaller are not beyond the scope and spirit of the present invention. While liquefied fuel products are illustrated in FIGS. 1A 1C, gaseous fuel products could easily be substituted therefor. The fuel products present in the fuel tanks 106 can be moved through secondary pipes 104 with a combination of pumps (not shown) and pump valves 110. While not illustrated in the Figures, the pump valves 110 and other secondary pipes 104 (not shown) extending from the pump valves 110 can be coupled to the pre-set hardware and software 122 as well as the load rack 124 for fuel distribution. The pump valves 110 can be controlled and monitored by a SCADA system 112. The pump valves 110 may or may not include software interfaces that communicate with the SCADA system 112.

SCADA System 112

As noted above, the SCADA system 112 comprises a supervisory control and data acquisition (SCADA) system that may include a stand-alone computer separate from the fuel distribution facility controller 126 for gathering and analyzing real time data generated by hardware such as the pump valves 110 and other hardware such as tank hardware and software 114 as will be described below. The SCADA system 112 can gather and analyze real time data generated by hardware or software (or both) of the bulk fuel distribution facility 100. The SCADA system is known to those of ordinary skill in the art and it generally gathers information, such as where a leak in a tank or on a pipeline has occurred, and transfers this information back to a central site such as the fuel distribution facility controller 126.

As a specific example, the SCADA system 112 can alert the fuel distribution facility controller 126 that a leak has occurred, as well as carrying out any necessary analysis and control with respect to the leak, such as determining if the leak is critical and providing data to the fuel distribution facility controller 126 for display in a logical and organized fashion. The SCADA system 112 can monitor and control the pump valves 110 as well as the tank hardware and software 114.

The SCADA system 112 can further comprise its own SCADA database 157. SCADA database 157 can store historical information relating to operations of hardware and software managed by the SCADA system 112. The SCADA database 157 may also include configuration data and other data used to manage the hardware and software coupled to the SCADA system 112.

Tank Hardware and Software 114

As noted above, the tank hardware and software 114 can comprise instrumentation and control devices such as tank gauges, software interfaces, software drivers, and buses. For references to software interfaces or interfaces described herein, each software interface or interface can comprise calling conventions by which an application program can access an operating system and other services. Each software interface can also comprise source code that can provide a level of abstraction between an application and a kernel to insure portability of the code used by a system.

A software interface can provide a link between a high level language and lower level utilities and services which may have been written without consideration for calling conventions supported by compiled languages. In such instances, the software interfaces may comprise a translation of parameter lists from one format to another and interpretations of call by value and call by reference arguments in one or both directions.

Meanwhile, a device driver may comprise software to control a hardware component or peripheral device. The device driver may be responsible for accessing hardware registers of a fuel hardware device and may include an interrupt handler to service interrupts generated by the fuel hardware device. The drivers may form part of the lowest level of the operating system kernel, with which they are linked when a kernel is built or after the device driver is installed from files after an operating system is running.

Other tank hardware and software 114 are not beyond the scope and spirit of the present invention. The fluid level instruments such as tank gauges may be manufactured by many different vendors. As noted above, vendors of tank hardware and software 114 such as for fluid level instruments like tank gauges may use proprietary software and hardware that may be manufactured in a non-standardized fashion. Often, vendors of fuel instrumentation will provide instruments that operate independently of other tank hardware and software. In other words, vendors of tank hardware and software 114 typically do not offer an integrated approach to managing multiple system components made by different vendors. Most tank hardware and software 114 designed by different vendors are intended to operate in a stand alone fashion independent of each other. In this way, an operator of a bulk fuel distribution facility will usually have separate controls and instrumentation corresponding to the vendor of each system component of a bulk fuel distribution facility 100.

Software Associated with Fuel Hardware

Software modules associated with fuel hardware can include interfaces or drivers (or both), but can be unique to a specific fuel hardware component such as a fluid level instrument. For example, a fluid level instrument can comprise a proprietary tank gauge or a bus associated with the tank gauge (or both). The proprietary tank gauge or bus can be unique and customized for a particular application. For example, a tank gauge for airline fuel products may be different than a tank gauge used for automobile fuel distribution. Other fuel hardware with unique interfaces or drivers (or both) can include, but are not limited to, pre-sets hardware and software 122 that may control distribution of fuel product, driver or carrier station terminal/station 132, valves, meters, programmable logic controllers (PLCs), gates, end instrumentation, and other like fuel hardware components. The hardware components can comprise measurement systems that may include, but are not limited to, radar, servo, mechanical, magnetostrictive, temperature, pressure, and flow measuring systems.

Pre-set Hardware and Software 122 and Load Rack 124

The pre-set hardware and software 122 are typically designed to control the load rack 124. The load rack 124 is typically used to dispense fuel product into a carrier 134. While the carrier 134 has been illustrated in FIG. 1 as a tank carrier, other types of carriers are not beyond the scope and spirit of the present invention. For example, the carrier 134 could include a train carrier or a boat carrier.

As noted above, the fuel product dispensed could be used for many different applications, such as for space rockets, planes, locomotive fuel, automobile fuel, power generation plant fuel, and other like energy applications.

The load rack 124 can comprise valves, meters, programmable logic controllers (PLCs), and meter recording devices for monitoring and dispensing fuel products. The number and type of components forming the load rack 124 is typically dependent on the type of fuel product that is dispensed or managed by the bulk fuel distribution facility 100. The load rack 124 may comprise a plurality of flow meters, valves, and connectors for multi-compartment and parallel carrier filling operations.

As noted above, the pre-set hardware and software 122 typically controls the components of the rack 124. The pre-set hardware and software 122 often permits a carrier or operator to enter a value for a predetermined volume of fuel product to flow through the load rack 124 prior to stopping. Pre-set hardware and software 122 can also include equipment for blending multiple fuel products together. Exemplary blending operations can include, but are not limited to, ratio, sequential, downstream, side stream, and other like blending operations. It is also noted that the pre-set hardware and software 122 can also allow dispensing a fuel product through the load rack without any blending The load rack pre-set database 120 may comprise various settings or parameters that can be used to control the load rack 124. The load rack preset database 120 may be accessed by the preset hardware and software 122. The Load Rack database provides information identifying Carriers, Drivers, Products, and Companies. Companies can include, but are not limited to, Customers, Owners and Shippers and the hierarchical relationship between them. For each customer, products authorized for loading and additive requirements are identified as are the carriers authorized for loading. Product Allocation Inventory control records exist to facilitate regulation of the loading for each Owner, Shipper and Customer in the company hierarchy.

The load rack 124 may also be coupled to a carrier/operator database 128 that may include data pertaining to specific carriers/operators. The Carrier/Operator database includes information identifying qualifications such as licenses, training, and insurance and the expiration date of these items. Access to the facility and loading is usually regulated in accordance with these qualifications.

The load rack 124 may be coupled to a carrier/operator station or terminal 132. The carrier/operator station or terminal 132 may comprise a device for receiving data input from the operator/driver 136 of the truck carrier 134 illustrated in FIGS. 1A IC. The carrier/operator station 132 can comprise a computer for receiving data from the operator 136 or it can comprise a simple terminal that may receive data bearing records such as magnetic stripe cards, smart cards, bar coded records, and other like data bearing records. The carrier/operator station allows the operator 136 to order the volume or type (or both) of fuel product desired to be loaded into the tank carrier 134. The carrier/operator station 132 may comprise a hard wired unit that is coupled to the load rack 124, or it may comprise a wireless device that is coupled to the load rack 124 by a wireless medium such as an RF link, an infrared link, and other like wireless links.

Fuel Distribution Facility Database 130

The fuel distribution facility database 130 can store configuration parameters for all of the hardware and software of the bulk fuel distribution facility 100. In addition to storing configuration parameters, the fuel distribution facility database 130 can also store historical information such as alarm and event management information, summary of fuel product movement that can include information on automatic and manual start and stops, interlock set points, hand gauged values, tank set points, calculation of totals on a given day, discrepancy calculations, daily closeout times, and tickets that have been printed for fuel products managed by the bulk fuel distribution facility.

Accounting Module 118

The fuel distribution facility controller 126 and the SCADA system 112 can be coupled to an accounting module 118. The Accounting module provides the tools to view all transactions, perform reconciliation of physical and book inventories, and report transactions and inventories to the central office. The Accounting module optionally interacts with the SCADA module to determine the storage location from which product is being dispensed at the load rack. Storage location information is recorded for each transaction to provide for the reconciliation process.

Application Extensions Modules 116

The accounting module 118 and the SCADA system 112 may also be coupled to one or more application extensions modules 116. An applications extension module 116 can provide custom functionality as may be required by an operator of the bulk fuel distribution facility 100. Application extensions modules 116 interface with the SCADA system 112 via standard software application programmer interfaces (API). Applications extension modules 116 can read process data from the SCADA system 112, perform customer-specific calculations and write the results back to process data tags within the SCADA system 112 or to another application within the bulk fuel distribution system 100. An application extension module 116 can also read transaction data from external systems and store these transactions in the accounting module 118. The accounting module 118 can transmit its data to a central office 146 through the distributed computer network 140.

Interactive Exemplary Embodiment of FIG. 1A

The accounting module 118 and the diagnostic support module 138 are coupled to a distributed computer network 140. The distributed computer network 140 can comprise a wide area network or the Internet. For the exemplary embodiment illustrated in FIG. 1A, a web browser 142 is also coupled the distributed computer network 140. The web browser 142 can be in a location remote from the fuel distribution facility 100. The web browser 142 can access the diagnostic support module 138A through the distributed computer network 140. The diagnostic support module 138A can support a webpage that can be accessed by the web browser 142. Accessing the web page for the universal locator (URL) supported by the diagnostic support module 138A can be an event that triggers the diagnostic support module 138A to perform its checks of the system components of the bulk fuel distribution facility 100.

According to this exemplary embodiment of the invention illustrated in FIG. 1A, the web browser 142 can access various web pages supported by the diagnostic support module 138A that may display different types of data that may be desired by the user of the web browser 142. The web browser 142 can access numerous diagnostic support modules 138A of various different bulk fuel distribution facilities 100 over the distributed computer network 140 and the web browser 142 can store this information concerning several different bulk fuel distribution facilities into a database 144.

Central Office 146

The central office 146 can store accounting data relating to a particular and bulk fuel distribution facility 100 in a database 148 of multiple fuel distribution facilities 100. The central office 146 may provide various services at the request of customers. The central office 146 in combination with its database 148 can provide data comprising transport requests and driver/operator access logs. The data can further comprise customer requested fuel product loads and driver access codes used at the carrier/operator stations 132 to allow distribution of fuel product from the load rack 124.

The central office 146 can provide this data according to predetermined formats generated by the operator(s) of the central office 146. Unlike the prior art, such as U.S. Pat. No. 6,370,515 issued in the name of Diamond et al. on Apr. 9, 2002, the central office 146 of the invention does not receive customer requests for formatting data and it does not provide data in response to the customer selecting a format for organizing the information retrieved or stored in the central database 148.

Batch File Exemplary Embodiment

Referring now to FIG. 1B, this figure illustrates a functional block diagram of a diagnostic support module 138B that is batch file accessible and that is coupled to the bulk fuel distribution facility 100. Several of the system components illustrated in FIG. 1B are similar to those illustrated and described with respect to FIG. 1A. Therefore, only the differences between FIG. 1A and FIG. 1B will be described hereinbelow.

The diagnostic support module 158B of FIG. 1B can support batch access in which the diagnostic support module 158B receives a set (a "batch") of commands or jobs, executes the jobs, and returns results without human intervention. This exemplary embodiment is contrasted against the aforementioned interactive web browser accessed diagnostic support module 138A illustrated in FIG. 1A in which a user's commands and the computer's responses can be interleaved during one or more runs.

The batch files 150 can provide commands over the distributed computer network 140 to the diagnostic support module 158B. The diagnostic support module 138B can support a queue of jobs in which the diagnostic support module processes the jobs as resources become available. According to this exemplary embodiment, diagnostic information concerning several different bulk fuel distribution facilities 100 can be collected and maintained at a central location such as the database of multiple fuel distribution facilities 144 that is coupled to the batch files facilities/module 150.

Sentry Exemplary Embodiment

Referring now to FIG. 1C, this figure illustrates a functional block diagram of a diagnostic support module 138C that is configured as a "sentry" and that resides in the system of a bulk fuel distribution facility 100. Several system components of the bulk fuel distribution facility 100 of FIG. 1C are similar to the system components illustrated in FIG. 1A. Therefore, only the differences between FIG. 1C and FIG. 1A will be described hereinbelow.

The diagnostic support module 138C can comprise a sentry-like module that can reside in the system software of the bulk fuel facility controller 126. This sentry diagnostics support module 138C can automatically perform its checks of system components according to a predetermined schedule or in response to specific events that may occur at the bulk fuel distribution facility 100. After performing its checks and analysis, the sentry diagnostic support module 138C can transmit the results of its checks and analyses over the distributed computer network 140 to central office 146 for storage on a database 148 of multiple fuel distribution facilities. Alternatively, or in addition to sending the results to the central office 146 for storage, the sentry diagnostics support module 138C can transmit its results over the distributed computer network 140 via an e mail message to a predetermined electronic address. Alternatively, these results can be transmitted over a computer network to an operator's pager, cell phone, or other like portable device. For example, the diagnostics support module can send results or a message as a text message to a pager.

Meanwhile, the results sent in the e-mail can have a predetermined format that can be generated in response to parameters that are desired by a particular facility operator. These e-mail messages containing diagnostic information can be sent to operators of bulk fuel distribution facilities 100 in the event of an alarm or the detection of a problem of any one of the system components that are part of the bulk fuel distribution facility 100.

Exemplary Process Flows for the Diagnostic Support Module's Monitoring of System Components and Detecting Errors or Potential Problems in a Bulk Fuel Distribution Facility The processes and operations of the diagnostic support module 138 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Process Overview

Figure 2:
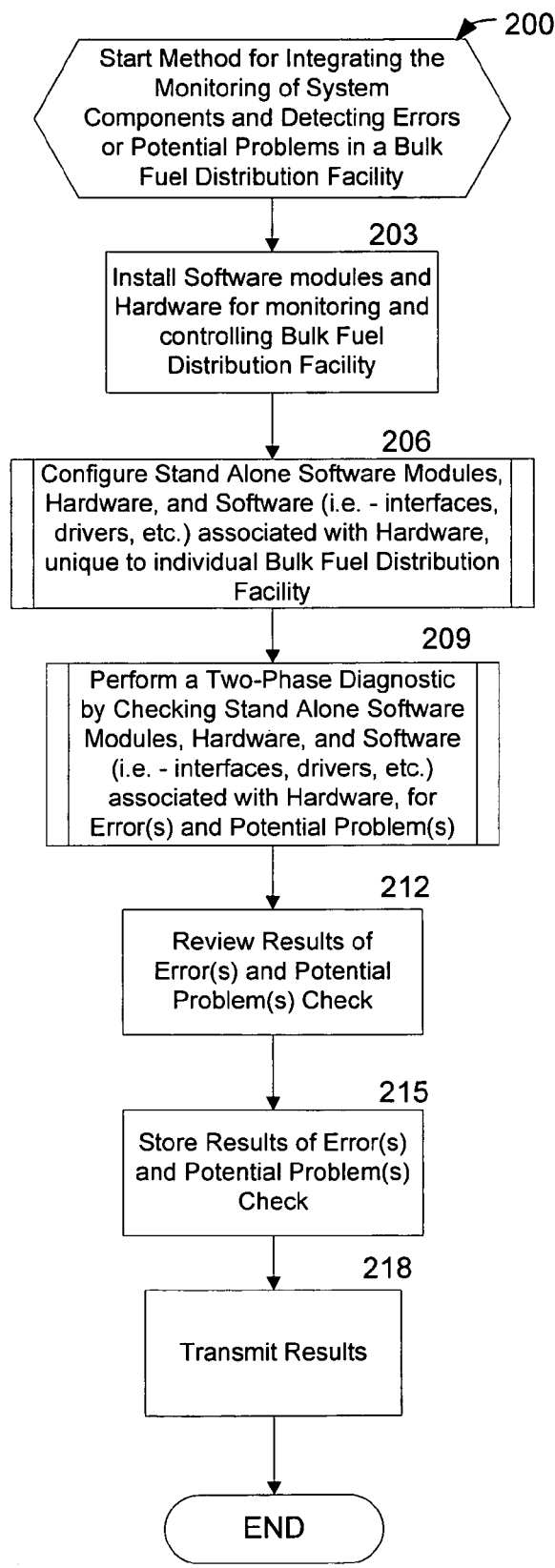
FIG. 2 is a logic flow diagram illustrating an overview of an exemplary process for integrating the monitoring of system components and detecting errors or potential problems (or both) in system components of a bulk fuel distribution facility according to one exemplary embodiment of the present invention.

Referring now to FIG. 2, this figure is a logic flow diagram illustrating an overview of an exemplary process 200 for integrating the monitoring of system components and detecting errors or potential problems (or both) in system components of a bulk fuel distribution facility 100 according to one exemplary embodiment of the present invention. Step 203 is the first step of process 200 in which software modules and hardware for monitoring and controlling the bulk fuel distribution facility 100 are installed.

Such software modules and hardware can include but are not limited to, SCADA system 112 components, instrumentation such as tank level instruments that include tank gauges, pre-sets that make controlled distribution of fuel product, driver or carrier terminals/stations 132, load rack equipment 124, valves, meters, programmable logic controllers (PLCs), tank gauge, pump valves 110, accounting modules 118, application extensions 116, modules supporting the fuel distribution facility controller 126, and other instrument, and other like fuel hardware and software components.

Next, in routine 206, stand alone software modules, hardware, and software associated with hardware, that are unique to an individual bulk fuel distribution facility 100 are configured. Configuring can include registering files needed to run particular software modules with a system registry. Further, other configuring steps can include, but are not limited to, identifying parameters used by a software interface as well as a data range that can be supported for a software module coupled to a hardware device. Further details of routine 206 will be described below with respect to FIG. 3.

Next, after routine 206, in routine 209, a two-phase diagnostic can be performed by the diagnostic support module 138 that checks the stand alone software modules, hardware, and software associated with hardware for errors and potential problems. The diagnostic support module 138 can perform system checks of the system components to determine if any components are missing or if errors or potential problems (or any combination thereof may exist in a particular bulk fuel distribution facility 100. The system checks performed by the diagnostic support module 138 can include, but are not limited to, comparing information collected from the system components against a predetermined set of validation rules as well as comparing results of previous diagnostic scans of both the system components. Routine 209 can be initiated or started in response to a triggering event. That is, according to one exemplary embodiment, routine 209 can be started in response to a user accessing a web page supported by the diagnostic support module 138. Further details of routine 209 will be described below with respect to FIG. 4.

Next, in step 212, the results of the two phase diagnostic routine of 209 are reviewed in this step. Errors and potential problems can be identified and can be verified. This review of step 212 can comprise checking the version of the software modules against expected values, checking checksums for files against expected values, checking compatibility of versions for interdependent files. The review of the results of the errors and potential problems can determine if a configuration is suitable for any additional testing.

Next, in step 215, the results of the errors and potential problems check can be stored locally in the fuel distribution facility configuration database 130. In step 218, the diagnostic support module 138 can transmit its results over the distributed computer network 140. The diagnostic support module 138 can provide the results according to predetermined formats generated by the operator(s) of the diagnostic support module 138. Unlike the prior art, such as U.S. Pat. No. 6,370,515 issued in the name of Diamond et al. on Apr. 9, 2002, the diagnostic support module 138 is not a central office database and does not receive customer requests for formatting the results data and it does not provide data in response to a customer selecting a format for organizing the information retrieved or stored in the database 130.

In one exemplary embodiment, as illustrated in FIG. 1A, the diagnostic support module 138 can transmit results over the distributed computer network 140 to a web browser 142. In another exemplary embodiment, as illustrated in FIG. 1B, the diagnostic support module 138B can transmit its results over the distributed computer network 140 to a batch file facility 150. And lastly, in another exemplary embodiment, as illustrated in FIG. 1C, the diagnostic support module 138C can transmit its results as an e-mail over the distributed computer network 140 to a client 152 with an electronic address. The process then ends.

Configuration Sub-method 206

Figure 3:
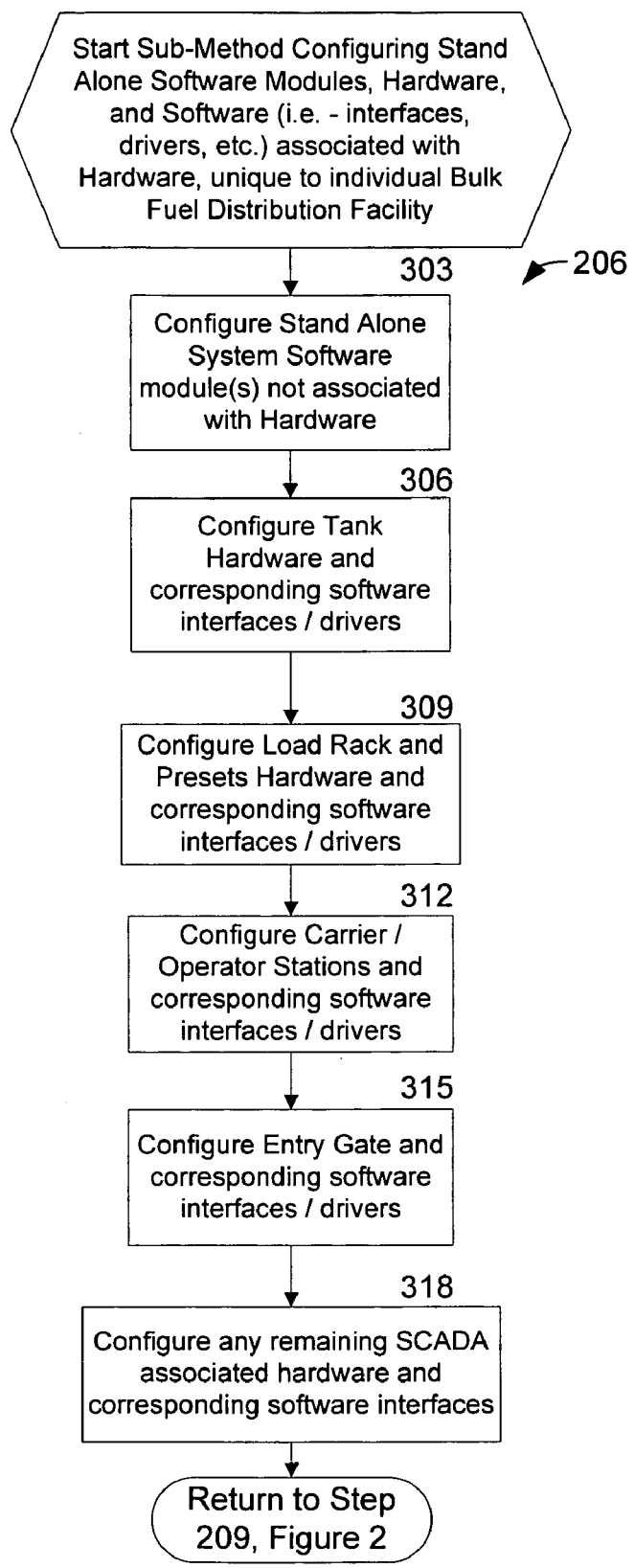
FIG. 3 is an exemplary logic flow diagram illustrating a method for configuring the software modules and fuel hardware of a bulk fuel distribution facility according to one exemplary embodiment of the present invention.

Referring now to FIG. 3, this figure is an exemplary logic flow diagram illustrating a sub-method or routine 206 for configuring the stand alone software modules, hardware, and software associated with hardware, that are unique to the individual bulk fuel distribution facility 100. Step 303 is the first step of the sub-method 206 in which stand alone system software modules not associated with hardware are configured.

As noted above, each of these steps for configuring software and hardware can include, but are not limited to, registering files needed to run certain modules with a system registry; identifying parameters needed to execute a particular software interface; and identifying a data range for software that may be associated with a particular hardware device. Other configuration steps are not beyond the scope and spirit of the present invention.

The stand alone software modules can comprise modules that form a part of the SCADA system 112. The stand alone software modules can also include the accounting module 118, the application extensions module 116, and some or all of the modules forming the fuel distribution facility controller 126.

Next, in step 306, tank hardware and corresponding software 114 that may comprise software interfaces and drivers are configured. In step 309, the load rack 124 and pre-set hardware and software 122 comprising software interfaces and drivers may be configured. Next, in step 312, carrier/operator stations 132 can be configured. The carrier/operator stations 132 can also comprise corresponding software interfaces or drivers (or both).

Next, in step 315, tank entry gate and corresponding software interfaces or drivers (or both) are configured. In step 318, any remaining SCADA system 112 associated hardware and corresponding software interfaces can be configured. The process then returns to step 209 of FIG. 2.

Checking System Components for Errors and Potential Problems Sub-method 209

Figure 4:
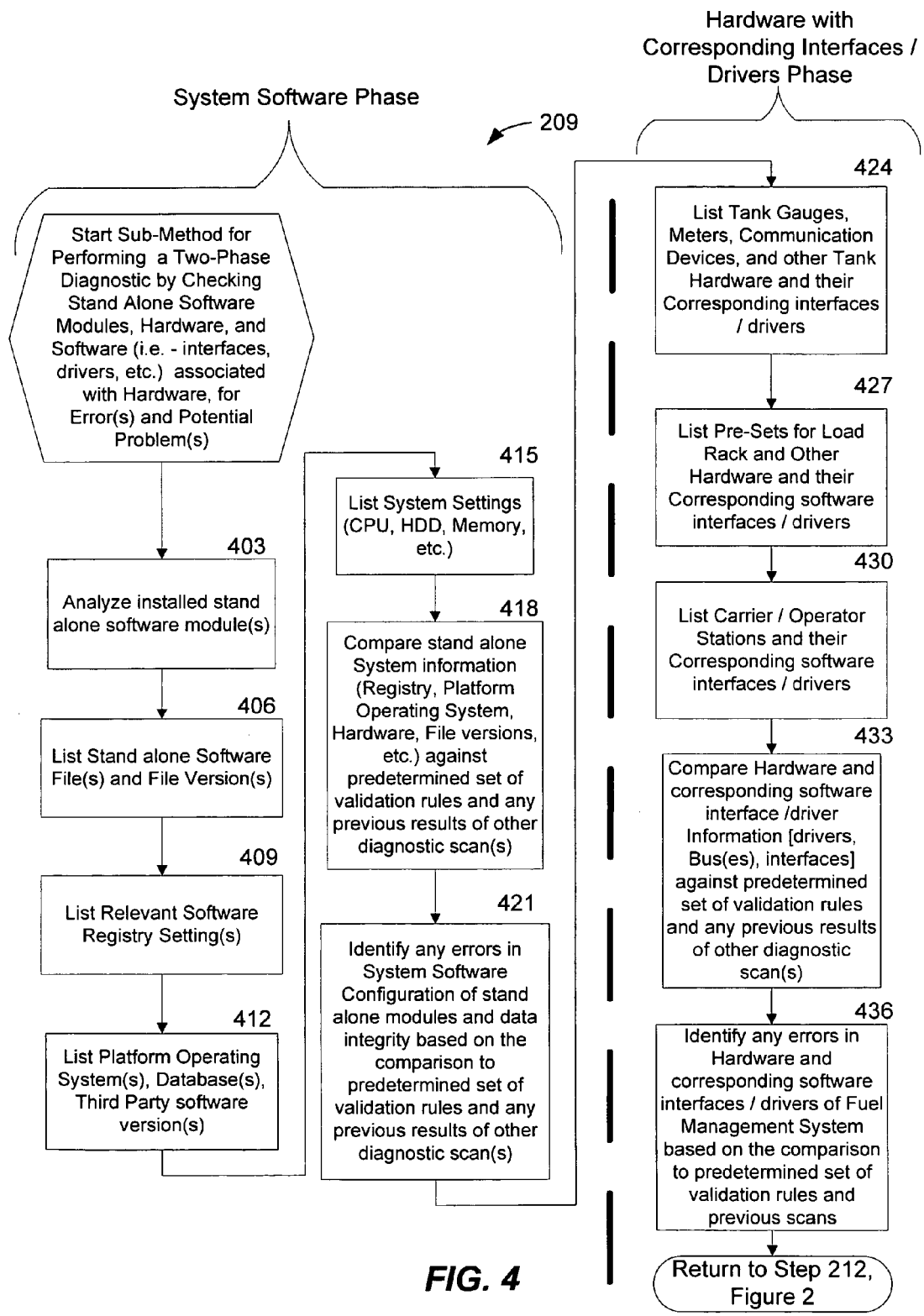
FIG. 4 is an exemplary logic flow diagram illustrating a method for checking the stand alone system software modules, fuel hardware components, and software modules associated with the fuel hardware for errors or potential problems or both of a bulk fuel distribution facility according to one exemplary embodiment of the present invention.

Referring now to FIG. 4, this figure is an exemplary logic flow diagram illustrating a sub-method or routine 209 for checking stand alone software modules, hardware, and software associated with hardware for errors and potential problems according to one exemplary embodiment of the present invention. Step 403 is the first step in the sub method or routine 209, in which stand alone software modules are analyzed. During this step, the diagnostic support module 138 determines the software modules previously installed on the computer. It determines the version of each software module by evaluating the registry or querying a hardware or software license protection key. This information is used in subsequent steps.

In step 406, the software files and file versions for the stand alone software modules are listed. In step 409, relevant software registry settings for the stand alone software modules are also listed. In step 412, the platform operating system, database, and any third party software reports are also listed.

In step 415, the system settings such as the parameters for the central processing unit, hard disk drive, and available memory are listed. In other words, these system settings are identified and reported to the user. In interactive mode, this information would be displayed in the web browser. In a batch or a sentry mode, this information can be stored in a file and sent to a database.

In step 418, the system information collected by the diagnostic support module 138 is compared against a predetermined set of validation rules or any previous results of other diagnostic scans (or both). Specifically, in step 418, the diagnostic support module 138 can perform system checks of the system components to determine if any components are missing or errors or potential problems (or combination thereof may exist in the bulk fuel distribution facility 100.

For example, a validation rule can include a table comprising a mapping of file versions to different software modules. This file version mapping table can help identify compatibility between different software modules. If the diagnostic support module identifies a discrepancy between file versions, it can flag this as a potential problem or as the cause of an existing problem in operation of the bulk fuel distribution facility 100. Another exemplary rule can use the version of the SCADA system 112 to identify files that should likely be present for the SCADA system 112 version existing on the system to operate properly. Another exemplary rule can compare previously stored diagnostic results with the current system or diagnostic check being performed by the diagnostic support module 138.

A further exemplary rule can compare the configuration data in the SCADA system 112 or the Fuel Distribution Facility Controller 126 with external databases for which the configuration data must match. Example external databases may include third-party software such as OPC Servers. Another exemplary rule can check the security configuration of the operating system against the security configuration of the SCADA system 112 and Fuel Distribution Facility Controller 126 to validate the security is configured properly. The aforementioned rules are just a few examples. Other rules of increasing or decreasing complexity are not beyond the scope of the invention.

In step 421, any errors in the system software configuration of the components of the bulk fuel distribution facility based on the comparison to the predetermined set of validation rules and any previous results of other diagnostic scans of step 418 are identified. Steps 403–421 form the first phase of the diagnostic checks performed by the invention. This phase is referred to the system software phase in which the stand alone software modules are checked.

Next, the remaining steps 424–436 form the second phase comprising the hardware with corresponding interfaces/drivers phase. In this second phase of the diagnostic routine or sub-method 209, the unique hardware with corresponding interfaces/drivers that are specific to the application of the bulk fuel distribution facility are analyzed.

Specifically, in step 424, tank gauges, meters, communication devices, and other tank hardware and software 114 that may include software interfaces or drivers (or both) are listed. Next, in step 427, pre-set hardware and software 122 for the load rack 124 and other hardware and corresponding software interfaces or drivers (or both) are listed. Next, in step 430, the carrier/operator stations 132 and their corresponding software interfaces or drivers (or both) are listed.

In step 433, the hardware and corresponding software interfaces or drivers (or both) are compared against another set of predetermined validation rules or any previous results of other diagnostic scans (or both). Similar to step 421 described above, validation rules for step 433 can also include a table comprising a mapping of file versions to different software modules. However, for step 433, this table will include unique hardware and corresponding software interfaces that are specific to the application of the bulk fuel distribution facility 100.

In step 436, any errors in the hardware and corresponding software interfaces or drivers (or both) of the bulk fuel distribution facility based on the comparison step of 433 are identified. The process then returns to step 212 of FIG. 2.

It should be understood that the foregoing relates only to illustrative embodiments of the present invention, and that numerous changes may be made therein without departing from the spirit and scope of the invention as defined by the following claims.

What is claimed is:

1. A method for reporting and monitoring of system components and for detecting at least one of errors and potential problems in components of a bulk fuel distribution facility comprising:
   configuring stand alone software modules of the bulk fuel distribution facility;
   configuring fuel product hardware of the bulk fuel distribution facility, wherein configuring fuel product hardware comprises configuring supervisory control and data acquisition (SCADA) system hardware, meters, pump valves, level instruments, pre-set hardware, a load rack, and a carrier terminal;
   configuring software modules associated with the fuel product hardware of the bulk fuel distribution facility;
   checking the stand alone software modules, fuel product hardware, and software modules associated with fuel product hardware for at least one of errors and potential problems; and
   reviewing results determined by the checking of the stand alone software modules, fuel product hardware, and software modules associated with fuel product hardware for at least one of errors and potential problems.

2. The method of claim 1, further comprising storing the results in a memory.

3. The method of claim 1, further comprising transmitting the results over a computer network.

4. The method of claim 1, further comprising installing software modules and hardware for monitoring and controlling the bulk fuel distribution facility, wherein installing software modules and hardware for monitoring and controlling further comprises installing at least one of a fuel distribution facility controller, SCADA system software and hardware, meters, pump valves, level instruments, pre-set hardware and software, load racks, an accounting module, and a carrier terminal.

5. The method of claim 1, wherein configuring stand alone software modules further comprises configuring a fuel distribution facility controller, SCADA system software, and an accounting module.

6. The method of claim 1, further comprising accessing the results by a web browser.

7. The method of claim 1, further comprising requesting access to the results with a batch file module.

8. The method of claim 1, further comprising automatically transmitting the results over a distributed computer network based on a schedule.

9. A method for reporting and monitoring of system components and for detecting at least one of errors and potential problems in components of a bulk fuel distribution facility comprising:
   configuring stand alone software modules of the bulk fuel distribution facility;
   configuring fuel product hardware of the bulk fuel distribution facility;
   configuring software modules associated with the fuel product hardware of the bulk fuel distribution facility;
   checking the stand alone software modules, fuel product hardware, and software modules associated with fuel product hardware for at least one of errors and potential problems, wherein checking comprises comparing the hardware and software system information to one or more validation rules, wherein comparing the hardware and software system information to one or more validation rules further comprises comparing software versions found in components of the bulk fuel distribution facility with software versions stored in a table; and
   reviewing results determined by the checking of the stand alone software modules, fuel product hardware, and software modules associated with fuel product hardware for at least one of errors and potential problems.

10. The method of claim 9, further comprising storing the results in a memory.

11. The method of claim 9, further comprising transmitting the results over a computer network.

12. The method of claim 9, further comprising installing software modules and hardware for monitoring and controlling the bulk fuel distribution facility, wherein installing software modules and hardware for monitoring and controlling further comprises installing at least one of a fuel distribution facility controller, supervisory control and data acquisition (SCADA) system software and hardware, meters, pump valves, level instruments, pre-set hardware and software, load racks, an accounting module, and a carrier terminal.

13. The method of claim 9, wherein configuring stand alone software modules further comprises configuring a fuel distribution facility controller, supervisory control and data acquisition (SCADA) system software, and an accounting module.

14. The method of claim 9, further comprising accessing the results by a web browser.

15. The method of claim 9, further comprising requesting access to the results with a batch file module.

16. The method of claim 9, further comprising automatically transmitting the results over a distributed computer network based on a schedule.

17. The method of claim 9, wherein configuring fuel product hardware comprises configuring supervisory control and data acquisition (SCADA) system hardware, meters, pump valves, level instruments, pre-set hardware, a load rack, and a carrier terminal.

* * * * *